United States Patent [19]

Anderson et al.

[11] Patent Number: 4,481,071
[45] Date of Patent: Nov. 6, 1984

[54] PROCESS OF LIFT OFF OF MATERIAL

[75] Inventors: Nathaniel C. Anderson, Pine Island; Robert B. Chesnut; Larry E. Daby, both of Rochester, all of Minn.

[73] Assignee: International Business Machines Corporation, Armonk, N.Y.

[21] Appl. No.: 566,871

[22] Filed: Dec. 29, 1983

[51] Int. Cl.$^3$ ............................ C23F 1/02; B44C 1/22; C03C 15/00; C03C 25/06
[52] U.S. Cl. ..................................... 156/656; 29/603; 156/643; 156/652; 156/666; 204/192 EC; 204/192 E; 427/131; 427/132
[58] Field of Search ............... 204/192 EC, 192 E; 29/603; 156/643, 656, 652, 659.1, 666; 427/48, 131, 132; 356/189; 252/79.2, 79.1; 360/119, 121, 130.31

[56] References Cited

U.S. PATENT DOCUMENTS 4,119,483 10/1978 Hubsch et al. ...................... 156/655

OTHER PUBLICATIONS

IBM Technical Disclosure Bulletin, vol. 18, No. 1, Jun. 1975, Thin Film and Thin-Film/Ferrite Hybrid Magnetic Heads, L. T. Romankiew et al., pp. 19-22.
IBM Technical Disclosure Bulletin, vol. 18, No. 1, Jun. 1975, High-Density Head, W. D. Kehr et al., pp. 27-28.

Primary Examiner—William A. Powell
Attorney, Agent, or Firm—Hugh D. Jaeger

[57] ABSTRACT

Process for lift-off fabrication of sputtered dielectric or nonmagnetic gap materials and thin-film heads for either a single-element thin-film head or side-by-side elements on a thin-film head. The lift-off process utilizes a copper coating that is removed by a twenty percent solution of ammonium persulfate with a pH in the range of seven to nine to assure complete removal of gap material from the back closure of the thin-film head without damage to the underlying permalloy. The process can also be utilized to obtain a multiple layer deposits on a single thin-film had by repeating the steps of the process. The process provides for a clean hole, no dielectric on the surface nor any attacking on the magnetic material.

7 Claims, 12 Drawing Figures

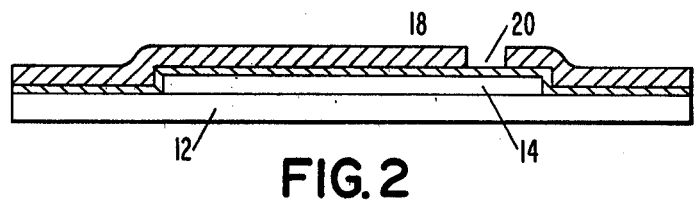
FIG. 1
FIG. 2
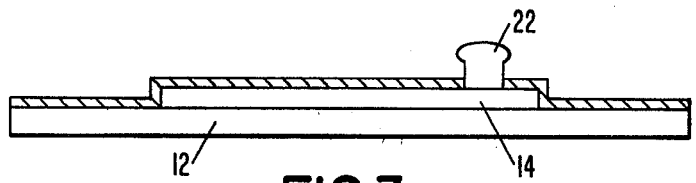
FIG. 3
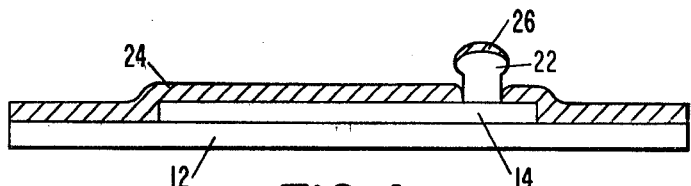
FIG. 4
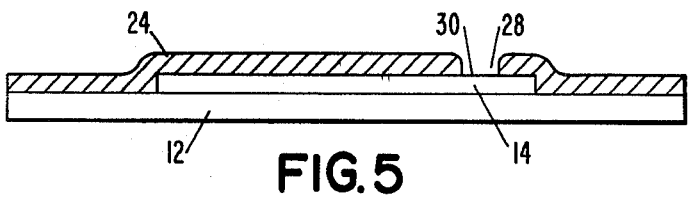
FIG. 5

PROCESS OF LIFT OFF OF MATERIAL

TECHNICAL FIELD

This invention relates to a process of lift-off of material, and more particularly, relates to a lift-off process for fabrication of sputtered dielectric or nonmagnetic gap materials for thin-film magnetic recording transducers.

BACKGROUND ART

Prior art film-head fabrication required a process of chemical etching of sputtered dielectric or nonmagnetic material to open the back gap region. End-point detection during the etching was very difficult to determine at best. Over-etching could result in attack on the underlying magnetic layer. Under-etching leaves a residual layer in the back gap which adversely effects the efficiency of the magnetic transducer by preventing intimate contact of the magnetic layers.

The prior art references do not address the problem of creating on a single substrate, a separate thin film as a (1.) read head and write head; (2.) read/write head and servo head; or, (3.) read head and write/servo head. The prior art has not achieved this type of fabrication through process of lift-off of material and, therefore, the prior art processes, while broadly touching on etching and lift-off processes, do not show the technique as now disclosed.

DISCLOSURE OF THE INVENTION

The purpose of the present invention is a process for deposition of a thin film transducer gap material only on selected areas by use of a lift-off process which will not attack the underlying magntic material.

According to one embodiment of the present invention, there is provided a lift-off process for fabrication of sputtered dielectric or nonmagnetic gap material on the thin film heads, including the steps of sputter depositing a layer of metal such as copper over a magnetic material and substrate, applying a positive photoresist, exposing to mask to open up the back areas or other required openings, electroplating through photoresist-mask metal such as copper to a thickness of approximately in the range of two to four times the required gap thickness, removing the resist, sputter etching to remove the metallization and depositing sputtered dielectric or nonmagnetic gap material such as aluminum oxide, silicon nitride, or quartz, and then etching away the copper with a solution of twenty percent ammonium persulfate having a pH in the range of 7-9. To further enhance the etching of the copper without attack on the magnetic material, sodium chloride can be added to the ammonium persulfate. This process is intended particularly for production of single-element thin-film heads for write-read-write or for side-by-side elements on a single substrate with different fabricated gap thicknesses.

One significant aspect and feature of the present invention is a process for lift-off which assures intimate contact between the upper and lower magnetic layers forming transducer yoke.

Another significant aspect and feature of the present invention is the elimination of the exposure of the magnetic material to phosphoric acid, the common etchant used in such processes for sputtered alumina, or other acids suitable for other dielectric or nonmagnetic materials, as well as eliminating the safety hazards associated with such etchant materials.

A further significant aspect and feature of the process is that the process can be utilized to obtain multiple thicknesses of deposit on a single device by repetition of the steps of the process.

BRIEF DESCRIPTION OF THE DRAWINGS

FIGS. 1-5 illustrate the lift-off process for fabrication of sputtered dielectric gap material in a representative thin-film head; and, FIGS. 6-12 illustrate a side-by-side lift-off gap fabrication for a read-write or read and servo or write head.

DISCLOSURE OF THE INVENTION

Figure 6:
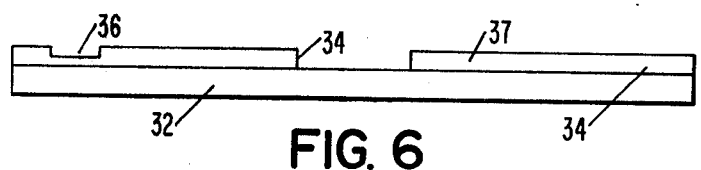

FIGS. 1-5 illustrate the lift-off process for fabrication of sputtered dielectric gap material in a representative thin-film head 10. FIG. 1 illustrates a substrate 12 a magnetic material 14, and a sputter deposit of approximately 800 angstroms of copper 16. FIG. 2 illustrates a positive photoresist 18 which has been applied and an exposure to mask to open a back gap area 20, by way of example and for purposes of illustration through subsequent development. FIG. 3 illustrates an electroplate through a photoresist-mask of copper 22 to a thickness in the range of approximately two to four times the desired gap thickness. This plated copper 22 assumes a mushroom shape and subsequently the photoresist 18 is removed as illustrated in the figure. FIG. 4 illustrates sputter etching to remove exposed copper metalization and sputter deposition of a dielectric or nonmagnetic gap material 24 and 26 such as alumina, silicon nitride or quartz, as any other like dielectric or nonmagnetic gap material. Finally, FIG. 5 illustrates etching away the copper with a solution of twenty percent ammonium persulfate a pH in the range of seven to nine. The lift-off process provides a magnetic closure region 28 with a contact surface 30 which is a clean geometrically defined hole with no dielectric material on the surface nor any attacking of the magnetic material 14.

Figure 7:
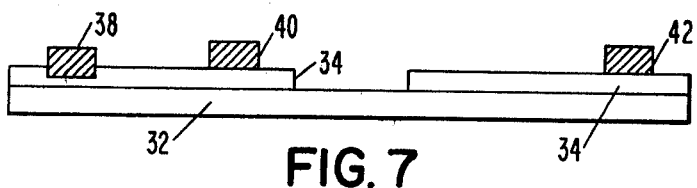
Figure 8:
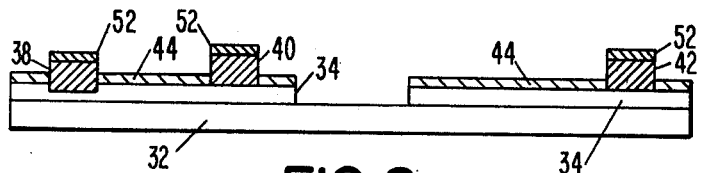
Figure 9:
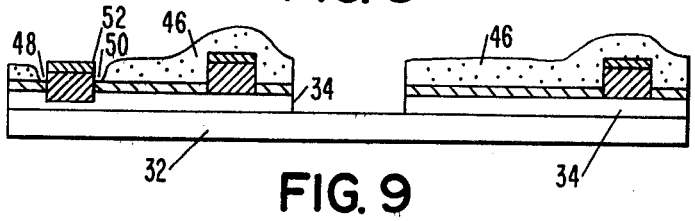
Figure 10:
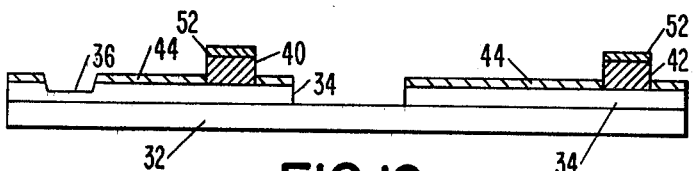
Figure 11:
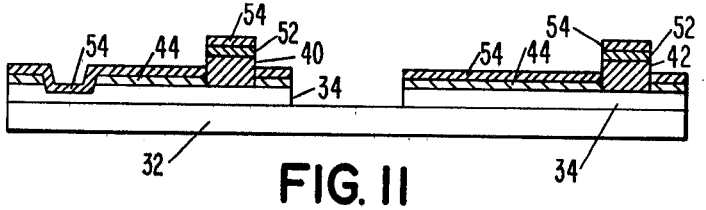
Figure 12:
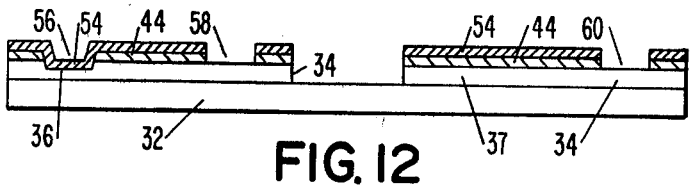

FIGS. 6-12 illustrate a specific embodiment of this invention for fabrication of read and write heads or read-write and servo heads with discrete gap dimensions on a single substrate. FIG. 6 illustrates a side-by-side configuration, including a substrate 32, a magnetic material 34, and gap regions 36 and 37. FIG. 7 illustrates plated copper 38 in the gap region 36, a back closure 40, and a back closure 42. The equal height is noted of the plated regions and closures. FIG. 8 illustrates gap material such as alumina $Al_2O_3$, deposited to the desired thickness. FIG. 9 illustrates photoresist covering 46 over the gap material and including no-resist covering at areas 48 and 50 while also protecting the plated copper at 40 and 42, as illustrated. FIG. 10 illustrates etching away the exposed copper and lifting off the gap material and removing the resist. Note is made of the gap 36 and the specific back closures 40 and 42 as now illustrated with the gap material 44. FIG. 11 illustrates depositing gap material 54 to a desired thickness, including over the previous gap material deposits 52. FIG. 12 illustrates etching away the copper and lifting off the gap material, providing a gap region 36, a thickness of 54, and gap region 37 of thickness 44 and 54 with closure regions 58 and 60 devoid of any gap material.

MODE OF OPERATION

The lift-off process utilizes a copper coating that is removed by a solution of about twenty percent ammonium persulfate, $(NH_4)_2S_2O_8$, having a pH of 7 to 9. An ammonium persulfate solution with a concentration in the range of 10 to 20 percent is used with 20 percent as a preferred optimum concentration. Ammonium persulfate becomes progressively less active as the concentration is decreased. The solution provides complete removal of gap material from the back closure area of a thin film without damage to the underlying magnetic material.

By using the steps of the process in repetition, multiple thicknesses of deposit on a single device can be obtained. Accordingly, different gap dimensions can be obtained on the same substrate.

The addition of up to 200 parts per million (p.p.m.) of sodium chloride, NaCl, to the ammonium persulfate will allow the copper to dissolve at a significantly faster rate with no damage to the magnetic material below the copper. NaCl additions of about 400 p.p.m. could result in attack on the underlying magnetic material by electrochemical dissolution.

The addition of the sodium chloride to the ammonium persulfate provides chloride ions in solution 200 p.p.m. of sodium chloride provides 100 p.p.m. of chloride ions. The selection of sodium chloride provides a low cost source of chloride ions that does not change the pH of the solution. Other reagents with similar functions are calcium chloride and potassium chloride which also can be used. Ammonium chloride may also be used as both a source of chloride ions and as a means for the control or adjustment of the pH of the solution.

We claim:

1. The process for fabrication of thin film magnetic transducer gaps by lift-off basic process comprising:
    a. sputter depositing a thin copper metalization layer;
    b. applying a non-conductive mask to predetermined selected portions of a surface of said metalization layers;
    c. plating copper on unmasked surfaces to a thickness at least twice the thickness of the desired gap and removing said non-conductive mask;
    d. sputter etching for removing said exposed metalization layer;
    e. sputter deposition of dielectric material; and,
    f. etching away said plated copper and remaining metalization layer material with a solution of ammonium persulfate.

2. The process of claim 1 wherein said ammonium persulfate, $(NH_4)_2S_2O_8$ is a twenty percent solution.

3. The process of claim 1 wherein said ammonium persulfate $(NH_4)_2S_2O_8$ is a 10 to 20 percent solution.

4. The process of claim 3 wherein said solution has a pH in the range of 7 to 9.

5. The process of claim 3 wherein said solution further comprises chloride ions less than 100 parts per million.

6. The process of claim 3 wherein said solution further comprises a range selected from the group of sodium chloride, calcium chloride, ammonium chloride and potassium chloride in a concentration to provide chloride ions of about 100 parts per million.

7. The process of claim 1 wherein multiple cycles of said process are involved to produce transducers with varying gap thicknesses on a single substrate.

* * * * *